United States Patent
Xu et al.

(10) Patent No.: US 8,610,944 B2
(45) Date of Patent: Dec. 17, 2013

(54) METHOD AND APPARATUS FOR SLOW SCAN MAGNIFICATION ADJUSTMENT USING NON-REDUNDANT OVERWRITING

(75) Inventors: Beilei Xu, Penfield, NY (US); Robert P. Loce, Webster, NY (US); Jess R. Gentner, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1226 days.

(21) Appl. No.: 12/336,654

(22) Filed: Dec. 17, 2008

(65) Prior Publication Data
US 2010/0149599 A1 Jun. 17, 2010

(51) Int. Cl.
G06K 15/02 (2006.01)
H04N 1/04 (2006.01)
G06T 5/00 (2006.01)
G06K 9/40 (2006.01)
G03F 9/00 (2006.01)

(52) U.S. Cl.
USPC ........... 358/1.2; 358/480; 358/3.27; 382/254; 430/22

(58) Field of Classification Search
None
See application file for complete search history.

(56) References Cited

U.S. PATENT DOCUMENTS

| | | | |
|---|---|---|---|
| 6,515,767 B1 * | 2/2003 | Sakurai | 358/1.9 |
| 6,763,141 B2 | 7/2004 | Xu et al. | |
| 2003/0175602 A1 * | 9/2003 | Kazama | 430/22 |
| 2006/0092264 A1 * | 5/2006 | Matsuzaki et al. | 347/233 |
| 2007/0139715 A1 | 6/2007 | Kazama et al. | |
| 2007/0165283 A1 | 7/2007 | Matsuzaki et al. | |
| 2008/0266619 A1 * | 10/2008 | Ang et al. | 358/480 |
| 2009/0142004 A1 * | 6/2009 | Gentner et al. | 382/294 |

* cited by examiner

Primary Examiner — Vu B Hang
Assistant Examiner — Neil R McLean
(74) Attorney, Agent, or Firm — Fay Sharpe LLP (57) ABSTRACT

A method of achieving process-direction sub-raster magnification adjustment using non-redundant overwriting. The raster imager provides overwriting while the image path provides non-redundant data for each pass according to the desired magnification adjustment. The same laser power level can be used for the multiple writes, or optionally, it may be varied to further improve spatial resolution of the adjustment.

18 Claims, 4 Drawing Sheets

METHOD AND APPARATUS FOR SLOW SCAN MAGNIFICATION ADJUSTMENT USING NON-REDUNDANT OVERWRITING

BACKGROUND

The systems and methods disclosed herein are related to the art of image rendering devices such as printers and displays. Embodiments will be described in terms of laser-based electrophotographic marking engines, such as those used in printers, photocopiers and facsimile machines. However, embodiments are applicable to other rendering devices, such as those that present image data in raster lines including display devices and other kinds of printers.

By way of background, print quality can suffer from misregistration defects in printing architectures. Image rendering (or printing) processes are physical in nature. That is, image rendering processes rely on physical structures which can influence rendered image quality and consistency. For instance, variation in phosphor quality or density in a cathode ray tube (CRT) or plasma display, light emitting diode (LED) efficiency in an LED display, and/or spatial variation in the light output of a fluorescent back light in a liquid crystal display (LCD) can cause color appearance variations across the surface of a display device. In printing systems, physical alignments, component tolerances, wear and component age can influence the uniformity with which colorants such as inks and toners are laid down across the surface of print media.

Further, in a printer/copying machine where toner is fixed to a sheet, moisture is evaporated by the influence of heat when an image is fixed on a sheet and the sheet is shrunk, or the sheet is stretched by the influence of pressure of the fixing processing. Additionally, sheets may be out-of-skew or out-of-register. Rotation and slanting may occur in the case where printing is carried out using an intermediate transfer member. In that case, a difference in nip balance in an axial direction of a transfer part causes a difference between a direction in which an image is transferred and a traveling direction of a sheet, and the rotation or slanting can occur. When such slanting/rotation occurs, an image printed on the sheet may become trapezoidal or fan-shaped.

In production printers there is a need to perform magnification adjustments to register duplex (i.e., side 1-to-side 2) printing. Process direction Electronic Registration (ER) as practiced in certain products has the resolution of the raster spacing and can suffer from image quality defects for many desirable halftones.

Thus, the exemplary embodiments relate to a new and improved method and apparatus that resolves the above-referenced difficulties and others.

INCORPORATION BY REFERENCE

The following patents/applications, the disclosures of each being totally incorporated herein by reference, are mentioned:

U.S. Publication No. US 2008/0266619 A1, published Oct. 30, 2008, entitled OPTICAL SCANNER WITH NON-REDUNDANT OVERWRITING, by Ang et al.;

U.S. application Ser. No. 11/948,281, filed Nov. 30, 2007, entitled SUB-RASTER REGISTRATION USING NON-REDUNDANT OVERWRITING, by Gentner et al.

BRIEF DESCRIPTION

A method of achieving process-direction sub-raster magnification adjustment using non-redundant overwriting is described herein. The imager provides overwriting while the image path provides non-redundant data for each pass according to the desired magnification adjustment. The same laser power level can be used for the multiple writes, or optionally, it may be varied to further improve spatial resolution of the adjustment.

In accordance with an aspect of the exemplary embodiments, a method of achieving process-direction sub-raster magnification adjustments using non-redundant overwriting is provided. The method includes: determining process-direction (or slow-scan) magnification errors on both sides of a printed sheet and a magnification compensation factor for the printed sheet; receiving raster data from a digital image path; buffering the raster data in a raster memory for overwriting a swath of pixel data; extracting raster data from the buffer according to a plurality of non-redundant overwriting (NRO) resampling calculations for magnification correction; and using the extracted raster data to drive a raster imager.

In accordance with another aspect of the exemplary embodiments, an apparatus for achieving process-direction sub-raster magnification adjustments using non-redundant overwriting is provided. The apparatus includes an image-forming apparatus that includes a raster imager and a control device for controlling the image-forming apparatus. The control device is operative to: determine slow-scan magnification errors on both sides of a printed sheet and a magnification compensation factor for the printed sheet; receive raster data from a digital image path; buffer the raster data in a raster memory for overwriting a swath of pixel data; extract raster data from the buffer according to a plurality of non-redundant overwriting (NRO) sampling calculations for magnification correction; and use the extracted raster data to drive the raster imager.

In accordance with yet another aspect of the exemplary embodiments, a computer program product comprising a computer-usable data carrier storing instructions that, when executed by a computer, cause the computer to perform a method of achieving process-direction sub-raster magnification adjustment using non-redundant overwriting is provided. The method includes: determining slow-scan magnification errors on both sides of a printed sheet and a magnification compensation factor for the printed sheet; receiving raster data from a digital image path; buffering the raster data in a raster memory for overwriting a swath of pixel data; extracting raster data from the buffer according to a plurality of non-redundant overwriting (NRO) sampling calculations for magnification correction; and using the extracted raster data to drive a raster imager.

DETAILED DESCRIPTION

For a number of reasons, including increased throughput, marking engines have been developed that provide a plurality of beams for altering the charge on an imaging member. For example, marking engines that provide thirty-two beams that sweep across the imaging member in a swath are available. However, writing image data in swaths often leads to stitching artifacts. That is, where the portion of an image written in a first swath abuts a portion of an image written in a second swath, slight registration errors or differences between the two swaths can become noticeable and may be visually displeasing. Accordingly, an apparatus for writing data in two passes with partially overlapping swaths has been developed.

As used herein, "print media" generally refers to a usually flimsy physical sheet of paper, plastic, or other suitable physical print media substrate for images, whether precut or web fed. A "print job" is normally a set of related sheets, usually one or more collated copy sets copied from a set of original document sheets or electronic document page images, from a particular user, or which are otherwise related.

As used herein, the term "data" refers generally to physical signals that indicate or include information. The terms "image" and "page," as used herein, refer to any image containing any, or all, of one or more halftone images, continuous tone images, line art or other graphics images, and/or any compilation of text, that is capable of being displayed on a display device or output on an image bearing substrate. For example, an image may be a combination of graphics and text that is stored in an image input device. The image may be a series of pixel values denoting the color, intensity, and/or any other known or later developed image property of the particular pixels that make up the image.

Each location in an image may be called a "pixel." Each pixel has certain pixel values associated with it. Each pixel value is a bit in a "binary form" of an image, or a gray scale value in a "gray-scale form" of an image, or a set of color space coordinates in a "color-coordinate form" of an image. The binary form, gray-scale form, and color-coordinate forms are each a two-dimensional array defining an image. An image can be digital, where the various forms of pixel values (i.e., bit, gray scale value, . . . ) are numerical values, or an image can be physical, such as colorants printed on a page, where pixel values are amounts of colorants at respective pixel locations. An operation typically performs "image processing" when it operates on an item of data that relates to part of an image.

Figure 1:
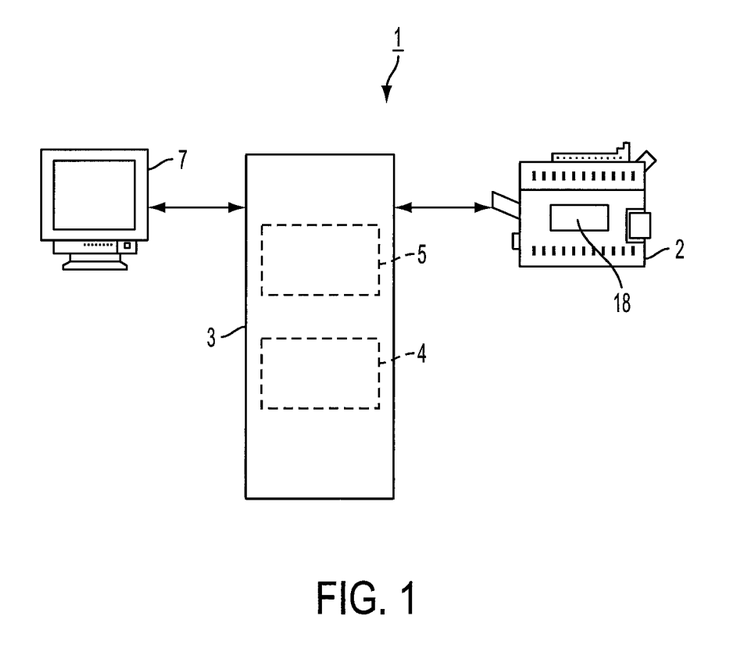
FIG. 1 is a view showing a structure of an image-forming system, laying stress on a control device suitable for implementing aspects of the exemplary embodiments.

Turning now FIG. 1, there is shown an image-forming (or printing) system 1 which includes an image-forming apparatus main body (or electro-photographic marking engine) 2 and a control device 3 including memory 4, a CPU 5 and the like, and a display and input device 7 including a display device, a keyboard and the like.

The control device 3 is generally housed in the image-forming apparatus main body 2. The control device 3 generally includes computer components such as a central processing unit (CPU) 5, memory storage devices 4 for the CPU 5, and connected display and input devices 7, for running one or more computer programs. Such computer program(s) may be stored in a computer readable storage medium, such as, but is not limited to, flash drives, hard drives, floppy disks, optical disks, CD-ROMs, magnetic-optical disks, read-only memories (ROMs), random access memories (RAMs), EPROMs, EEPROMs, magnetic or optical cards, DVDs, or any type of media suitable for storing electronic instructions, and each coupled to a computer system bus.

In electro-photographic marking engines, such as the one shown in FIG. 1, an imaging member, such as a belt or drum, is made to carry an electrostatic charge. Portions of the imaging member are then exposed to light. The light discharges the selected portions.

The electro-photographic marking engine 2 includes an optical scanning device (or raster imager), which can be provided with an array-form semiconductor laser (below referred to as a "laser array") and a polygon mirror (a rotating multi-faced mirror). The polygon mirror can be formed in a regular polygonal shape and provided with a plurality of reflection surfaces at side faces thereof, and can be rotated at high speed by a motor (not shown). The laser array can be a vertical cavity surface emitting laser array—raster output scanner (VCSEL-ROS) in which a plurality of light emitting spots are arranged in two dimensions.

The VCSEL array is a multi-spot laser diode in which the plurality of light emitting spots are arranged in two dimensions. The multi-spot laser diode can have a total of thirty-six light emitting spots disposed two-dimensionally with predetermined spacings, six in a main scanning direction by six in a sub-scanning direction. In another arrangement, the multi-spot laser diode can have a total of thirty-two light emitting spots disposed two-dimensionally with predetermined spacings, eight in one scanning direction by four in another scanning direction. These exemplary arrangements are for illustration purposes and are not intended to be limiting of the disclosure. Other optical scanner reductions to practice are well known to those skilled in the art. For example, the light emitting device can be a single edge emitting laser structure having a multiplicity of emitters on a single chip, or the device can be constructed of a multiplicity of diodes. The scanning function, shown implemented by a rotating polygon mirror, could also be implemented by an oscillating galvanometer or a micro-electro-mechanical system.

The electro-photographic marking engine 2 also includes mechanisms for duplex printing as known to those skilled in the art. That is, after the appropriate single color, or multi-color image is transferred to the medium, the medium may be flipped and transferred again to the toner image transfer assembly such that images are produced on both sides of the medium.

An exemplary method achieves process-direction sub-raster magnification adjustments using non-redundant overwriting. The raster imager provides overwriting, while the image path provides non-redundant data for each writing pass according to the desired magnification adjustment. In other words, the image path architecture provides an efficient mechanism for generating non-redundant data for magnification adjustment in an overwriting system. The same laser power level can be used for the multiple writes, or optionally, it may be varied to further improve spatial resolution of the adjustment.

Figure 2:
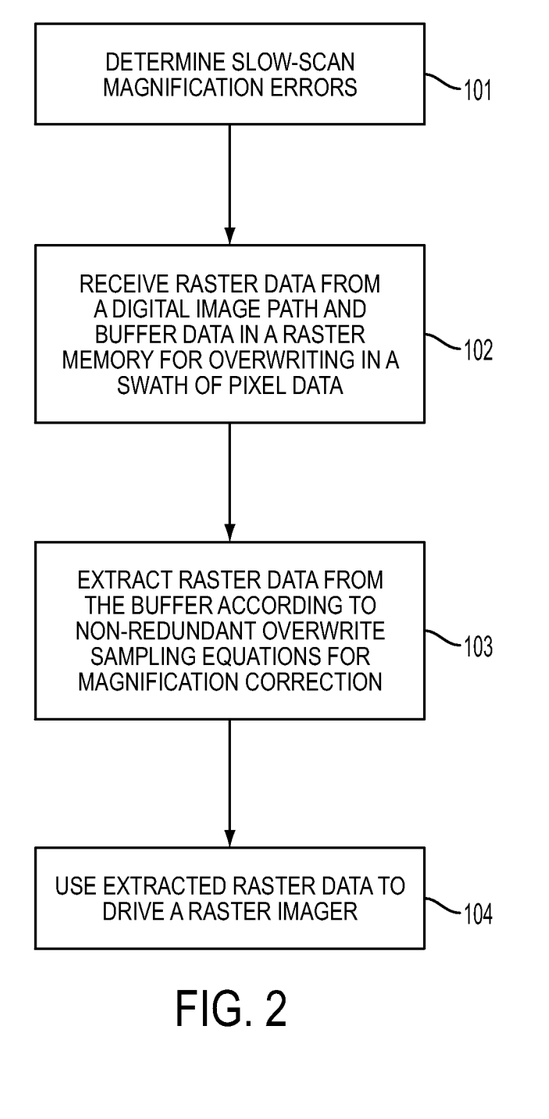
FIG. 2 is a flow chart outlining an exemplary method for addressing magnification errors.

With reference now to FIG. 2, the exemplary method of achieving process-direction sub-raster magnification adjustments using non-redundant overwriting includes the following steps:

The slow-scan magnification errors are determined by either off-line measurement or in-line sensors (101).

Raster data is received from a digital image path and buffered in a raster memory in a manner suitable for overwriting a swath of pixel data (102).

Raster data is extracted from the buffer according to the non-redundant overwriting (NRO) sampling equations for the magnification correction, and optionally for other corrections, such as ROS bow and skew (103).

The extracted raster data is used to drive the raster imager 18 (104).

With respect to step 101, slow-scan (or process-direction) magnification errors arise primarily due to paper shrinkage in duplex (i.e., side 1 to side 2) printing, but can also occur due to system considerations such as speed of mechanical drives and ROS MPA speed. Paper shrinkage after side 1 is printed can produce misregistration between side 1 and side 2 for up to 0.1% of the paper length, which can be as much as a few hundred microns. Given that the total registration goal is around 200 μm, having 200 to 300 μm from paper shrinkage alone is unacceptable. In order to maintain registration between side 1 and side 2 in the presence of paper shrinkage, images printed on side 2 may require magnification compensation. Note that the magnification errors may not necessarily be uniform in the process direction and they may not necessarily be constant in the cross-process direction.

The required compensation factor for a given print can be determined by a variety of methods, including, but not limited to any of the following methods:

- Offline characterization of paper shrinkage for individual media type or average characterization over a range of media. Offline characterizations can be stored and pulled into active use when the appropriate media is being printed.
- Real-time measurement of paper size.
- Real-time velocity measurement of printer components.

The slow scan magnification characterization can be represented in terms of a magnification factor or as local or global displacements. The factor or displacements are not necessarily uniform, but could be made to fit a uniform model if it aided the implementation or reduced noise in the measurement.

With respect to step 102, raster data is received from a digital image path and buffered in the raster memory in a manner suitable for overwriting a swath of pixel data.

Two-pass overwriting in a multi-beam imaging system typically involves writing m rasters per scan as a swath where m/2 of these raster lines may be repeated from the previous adjoining swath. Therefore, for each swath, m/2 new raster lines must be brought into raster line buffer, and they can write over the m/2 raster lines in the buffer that have already been written twice.

Figure 3:
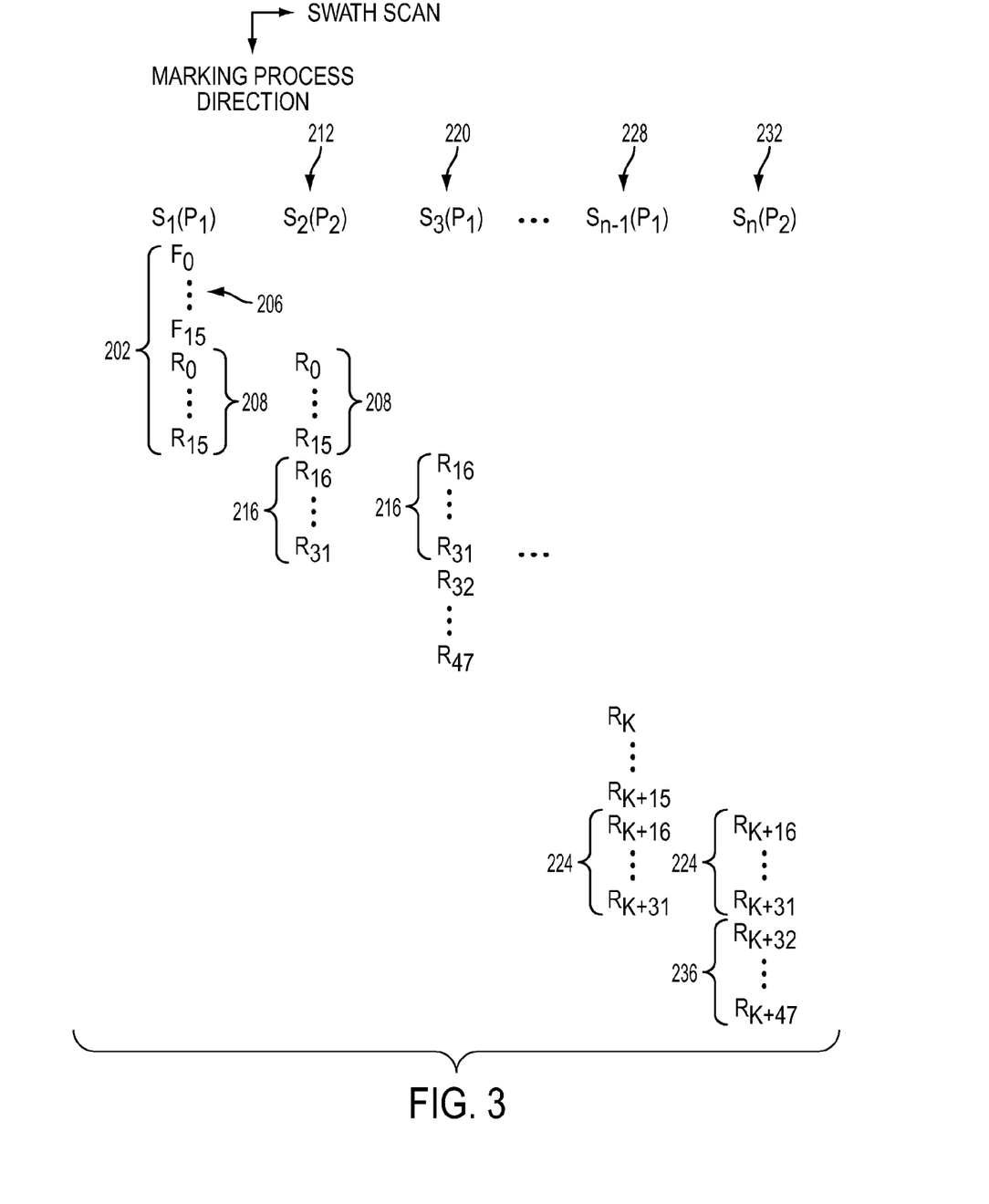
FIG. 3 illustrates a writing pattern including a plurality of swaths and 2-pass overwriting.

To better understand the raster line buffering in an overwriting system, consider FIG. 3, which illustrates a 32-beam VCSEL-ROS operating at interlace 1 with 2-pass overwrite where:

$S_{n-1}(P_1)$=Swath scan n−1 using laser power $P_1$
$S_n(P_2)$=Swath scan n using laser power $P_2$
$P_1=P_2$ for 1-power overwriting
$P_1 \neq P_2$ for 2-power overwriting
$R_k$=kth raster line of the input image
$F_q$=Filler rasters used for initial alignment and coarse raster line positioning A first swath 202 includes a minimum of sixteen filler rasters 206, which may be, for example, blank, and sixteen real image data rasters 208. It is to be understood that it be helpful to add more filler rasters to align multiple channels or to move the start of an image relative to an image synchronization signal. In a second swath 212, the same data 208 is written again in a physically overlapping manner. For instance, each writing pass transfers half the desired charge at those portions of the imaging number for which charge transfer is desired. Since each image raster is written by a first (odd) and a second (even) pass, any registration error between the first and second passes is included in each raster and no step discontinuities are included in the rendered image.

The process is repeated for the entire image. For example, a second group 216 of sixteen rasters is written first as part of the second swath 212 and, redundantly, with the same data, again in the third swath 220. At the end of the image, a final group 224 of sixteen rasters is written first in the second to last swath 228 and again in the last swath 232. A last set of sixteen rasters 236 may be image data as shown or filler or padding data that is, for example, blank.

With respect to step 103, raster data is extracted from the raster buffer according to the NRO sampling equations for the magnification correction, and optionally for other corrections, such as raster output scanner bow and skew.

In the example described herein, NRO is used to resample an image using interpolation information from neighboring raster lines. When considering a uniform magnification correction alone, an entire output raster line will be formed by interpolation from the same neighbors. When considering magnification that is not uniform across the marking process and/or additional displacement errors such as bow and skew are included, an output raster line will be formed by interpolation between different neighbors along its length.

The resampling interpolates between neighboring raster lines in a particular manner to distort, and thus compensate for misregistration error. Resampling can be described as using blended values from neighboring rasters to produce an effect of shifting image information to appear to be at locations (pseudo rasters) between the actual physical raster lines. When using the same power level for the two overwrite passes, one pseudo raster line exists midway between each pair of actual rasters. When using the ⅓ and ⅔ exposure for the two write passes, two pseudo rasters exist between the actual rasters and are located in equi-spaced ⅓ distances between the actual rasters. A table may be used to store displacement errors used in the resampling calculations.

Resampling is performed according to the following pixel extraction equations. Note that the magnification (m) in the equations below is treated as uniform or as representing one point in the field. In practice, for some papers, images, or marking processes, the magnification could have a spatial dependence. Also note that magnification here is converted to displacement (d) and other displacements such as bow and skew could be added to this d.

Further, with respect to the equations presented below, let
i=raster line number
j=cross-process pixel number
$B(1,i,j)$=Output bit written on actual raster number i, pixel j with pass (power) 1
$B(2,i,j)$=Output bit written on actual raster number i, pixel j with pass (power) 2
$B_0(i,j)$=Bit on ideal desired raster i
$p_{ij}$=Actual slow scan position of pixel i, j
$p_{Oij}$=Desired slow scan position of pixel i, j
$d(i,j)=p_{ij}-p_{Oij}$ Slow scan displacement error for desired raster i, pixel j, if written with actual raster i. d is positive in the direction down the page. (Note that the j dependence will not be shown in several of the formulae below to simplify their appearance.)

$\Delta$=Actual raster spacing (e.g., $\Delta \approx 10.6$ μm for 2400×2400 spi VCSEL resolution).
m=Desired magnification change (e.g., m=1 for no change, m<1 for shrinkage error).

Now, for uniform magnification $$d(i)=i(1-m)\Delta \quad (1)$$

Let n(i)=an integer indicating the raster line to draw from, referenced from the current line i. For instance, if the desired raster number 100 is very close to the ideal raster 98 and should be printed with raster 98, then n(100)=2. Further, n(i) varies depending on d(i), thus it has an i dependence. While d(i) is a representation of displacement error, n(i) is a representation of a correction function.

Note that for both d and n, several possible representations could be used depending on the electronic implementation and the particular type of displacement error. For instance, these profiles could be represented as referenced from a common origin or in terms of local differences.

There are several assumptions applicable to the equations disclosed herein:
For equal-power overwrite, Power1≈Power2. $B(1, i, j)$ has the same interpolation weight as $B(2,i,j)$.
For ⅓-power overwrite, Power1≈Power2/2. $B(2, i, j)$ has twice the interpolation weight as $B(2,i,j)$.

$\Delta' = $ sub-raster spacing for pseudo rasters $= \Delta/2$ for equal-power overwrite for write twice $= \Delta/3$ for 1/3-2/3 power overwrite for write twice For equi-power non-redundant overwriting, the power selection can be written as:

$$B(1,i,j)=B_0(i+n(i),j) \text{ for } (-\tfrac{1}{4}+n(i))\Delta \leq d(k) \leq (\tfrac{3}{4}+n(k))\Delta,$$
$$\text{equivalently } d(i)/\Delta - \tfrac{3}{4} \leq n(i) \leq \tfrac{1}{4}+d(i)/\Delta \quad (2)$$

$$\text{or } n(i)=\text{FLOOR}[\tfrac{1}{4}+d(i)/\Delta]=\text{CEIL}[d(i)/\Delta-\tfrac{3}{4}] \quad (3)$$

$$B(2,i,j)=B_0(i+n(i),j) \text{ for } (-\tfrac{3}{4}+n(i))\Delta d(k) \leq (\tfrac{1}{4}+n(i))\Delta,$$
$$\text{equivalently } d(i)/\Delta - \tfrac{1}{4} \leq n(i) \leq \tfrac{3}{4}+d(i)/\Delta \quad (4)$$

$$\text{or } n(i)=\text{FLOOR}[\tfrac{3}{4}+d(i)/\Delta]=\text{CEIL}[d(i)/\Delta-\tfrac{1}{4}] \quad (5)$$

By substituting Eq. (1) for uniform magnification compensation into Eqs. (3) and (5), we obtain:

$$\text{For } B(1,i,j), n(i)=\text{FLOOR}[\tfrac{1}{4}+i(1-m)]=\text{CEIL}[i(1-m)-\tfrac{3}{4}] \quad (6)$$

$$\text{For } B(2,i,j), n(i)=\text{FLOOR}[\tfrac{3}{4}+i(1-m)]=\text{CEIL}[i(1-m)-\tfrac{1}{4}] \quad (7)$$

In practice, paper shrinkage might not be constant within a page. The magnification factor m can be a function of raster line i as well as cross-process position j. Also, note that raster line offsets $d_0$ can be employed to accommodate distortion corrections such as ROS bow and skew. Additionally, $d_0$ could be varied as a function of j to allow the magnification compensation to be varied too so that the raster line blending occurs at different slow-scan locations to prevent potential stripe defects. To accommodate this more general slow-scan displacement, let $m(i, j)$ denote magnification in the slow scan direction, and let $d_0(j)$ denote additional offsets. The distance error can be written as:

$$d(i, j) = d_0(j) + \sum_{k=0}^{i} k(1-m(i, j))\Delta \quad (8)$$

If needed, Eq. (8) can be used in Eqs. (2-5) rather than using the simpler expression for d as shown in Eq. (1).

Similar interpolation equations can be written for the 2-power case, where ⅓ exposure and ⅔ exposure is performed for the two writings:

$$B(1,i,j)=B_0(i+n(i),j) \text{ for } (-\tfrac{1}{6}+n(i))\Delta \leq d(i) \leq (\tfrac{1}{6}+n(i))\Delta$$

$$B(1,i,j)=B_0(i+n(i)+1,j) \text{ for } (\tfrac{1}{6}+n(i))\Delta \leq d(i) \leq (\tfrac{3}{6}+n(i))\Delta$$

$$B(1,i,j)=B_0(i+n(i),j) \text{ for } (\tfrac{3}{6}+n(i))\Delta \leq d(i) \leq (\tfrac{5}{6}+n(i))\Delta \quad (9)$$

$$B(2,i,j)=B_0(i+n(i),j) \text{ for } (-\tfrac{1}{6}+n(i))\Delta \leq d(i) \leq (\tfrac{3}{6}+n(i))\Delta$$

$$B(2,i,j)=B_0(i+n(i)+1,j) \text{ for } (\tfrac{3}{6}+n(i))\Delta \leq d(i) \leq (\tfrac{5}{6}+n(i))\Delta \quad (10)$$

Or, equivalently:

$$B(1,i,j)=B_0(i+n(i),j) \text{ for } d(i)/\Delta - \tfrac{1}{6} < n(i) \leq d(i)/\Delta + \tfrac{1}{6}$$

$$B(1,i,j)=B_0(i+n(i)+i,j) \text{ for } d(i)/\Delta - \tfrac{3}{6} < n(i) \leq d(i)/\Delta - \tfrac{1}{6}$$

$$B(1,i,j)=B_0(i+n(i),j) \text{ for } d(i)/\Delta - \tfrac{5}{6} \leq n(i) \leq d(i)/\Delta - \tfrac{3}{6} \quad (11)$$

$$B(2,i,j)=B_0(i+n(i),j) \text{ for } d(i)/\Delta - \tfrac{3}{6} < n(i) \leq d(i)/\Delta + \tfrac{1}{6}$$

$$B(2,i,j)=B_0(i+n(i)+1,j) \text{ for } d(i)/\Delta - \tfrac{5}{6} < n(i) \leq d(i)/\Delta - \tfrac{3}{6} \quad (12)$$

While the above mathematical representations have been used to teach the sampling concepts of the exemplary method, it is to be understood that equivalent mathematic representations exist and should be covered by the general teachings.

Table 1 below provides an example of raster resampling for the first 22 rasters in a 2-power (⅓, ⅔) overwriting architecture. A magnification m of 0.95 was used at 2400 spi ($\Delta \approx 10.6$ μm). Raster Index i is shown in column 1. Actual and desired raster positions are given in Columns 2 and 3, respectively. "Desired position of raster i" refers to raster positions that would be ideally shifted to accommodate 0.95 scaling. Column 4 shows the positional error without compensation. Column 5 shows the operations of the raster sampling equations for each raster. Column 6 shows the raster position achieved for resampled rasters. Column 7 shows the residual error, which is $\leq \Delta/6$ (1.77 μm). Without the present resampling scheme, the error would be hundreds of microns for some positions on a page for much smaller magnification requirements.

TABLE 1

| Raster Index i | Actual position of raster i $i\Delta$ (μm) | Desired position of raster i to achieve, m = 0.95 $im\Delta$ (μm) | Positional error of raster i without compensation, d(i) (μm) | Desired bit combination | Position achieved for raster i (μm) | Residual error (μm) |
|---|---|---|---|---|---|---|
| 0 | 0 | 0 | 0 | $B(1, 0) = B_0(0); B(2, 0) = B_0(0)$ | 0 | 0 |
| 1 | 10.6 | 10.07 | 0.53 | $B(1, 1) = B_0(1); B(2, 1) = B_0(1)$ | 10.6 | 0.53 |
| 2 | 21.2 | 20.14 | 1.06 | $B(1, 2) = B_0(2); B(2, 2) = B_0(2)$ | 21.2 | 1.06 |
| 3 | 31.8 | 30.21 | 1.59 | $B(1, 3) = B_0(3); B(2, 3) = B_0(3)$ | 31.8 | 1.59 |
| 4 | 42.4 | 40.28 | 2.12 | $B(1, 4) = B_0(5); B(2, 4) = B_0(4)$ | 38.87 | −1.41 |
| 5 | 53 | 50.35 | 2.65 | $B(1, 5) = B_0(6); B(2, 5) = B_0(5)$ | 49.47 | −0.88 |
| 6 | 63.6 | 60.42 | 3.18 | $B(1, 6) = B_0(7); B(2, 6) = B_0(6)$ | 60.06 | −0.36 |
| 7 | 74.2 | 70.49 | 3.71 | $B(1, 7) = B_0(8); B(2, 7) = B_0(7)$ | 70.67 | 0.18 |
| 8 | 84.8 | 80.56 | 4.24 | $B(1, 8) = B_0(9); B(2, 8) = B_0(8)$ | 81.27 | 0.71 |
| 9 | 95.4 | 90.63 | 4.77 | $B(1, 9) = B_0(10); B(2, 9) = B_0(9)$ | 91.87 | 1.24 |

TABLE 1-continued

| Raster Index i | Actual position of raster i iΔ (μm) | Desired position of raster i to achieve, m = 0.95 imΔ (μm) | Positional error of raster i without compensation, d(i) (μm) | Desired bit combination | Position achieved for raster i (μm) | Residual error (μm) |
|---|---|---|---|---|---|---|
| 10 | 106 | 100.7 | 5.3 | $B(1, 10) = B_0(10); B(2, 10) = B_0(11)$ | 98.93 | −1.77 |
| 11 | 116.6 | 110.77 | 5.83 | $B(1, 11) = B_0(11); B(2, 11) = B_0(12)$ | 109.53 | −1.24 |
| 12 | 127.2 | 120.84 | 6.36 | $B(1, 12) = B_0(12); B(2, 12) = B_0(13)$ | 120.13 | −0.71 |
| 13 | 137.8 | 130.91 | 6.89 | $B(1, 13) = B_0(13); B(2, 13) = B_0(14)$ | 130.73 | −0.18 |
| 14 | 148.4 | 140.98 | 7.42 | $B(1, 14) = B_0(14); B(2, 14) = B_0(15)$ | 141.33 | 0.35 |
| 15 | 159 | 151.05 | 7.95 | $B(1, 15) = B_0(15); B(2, 15) = B_0(16)$ | 151.93 | 0.88 |
| 16 | 169.6 | 161.12 | 8.48 | $B(1, 16) = B_0(16); B(2, 16) = B_0(17)$ | 162.53 | 1.41 |
| 17 | 180.2 | 171.19 | 9.01 | $B(1, 17) = B_0(18); B(2, 17) = B_0(18)$ | 169.6 | −1.59 |
| 18 | 190.8 | 181.26 | 9.54 | $B(1, 18) = B_0(19); B(2, 18) = B_0(19)$ | 180.2 | −1.06 |
| 19 | 201.4 | 191.33 | 10.07 | $B(1, 19) = B_0(20); B(2, 19) = B_0(20)$ | 190.8 | −0.53 |
| 20 | 212 | 201.4 | 10.6 | $B(1, 20) = B_0(21); B(2, 20) = B_0(21)$ | 201.4 | 0 |
| 21 | 222.6 | 211.47 | 11.13 | $B(1, 21) = B_0(22); B(2, 21) = B_0(22)$ | 212 | 0.53 |

Figure 4:
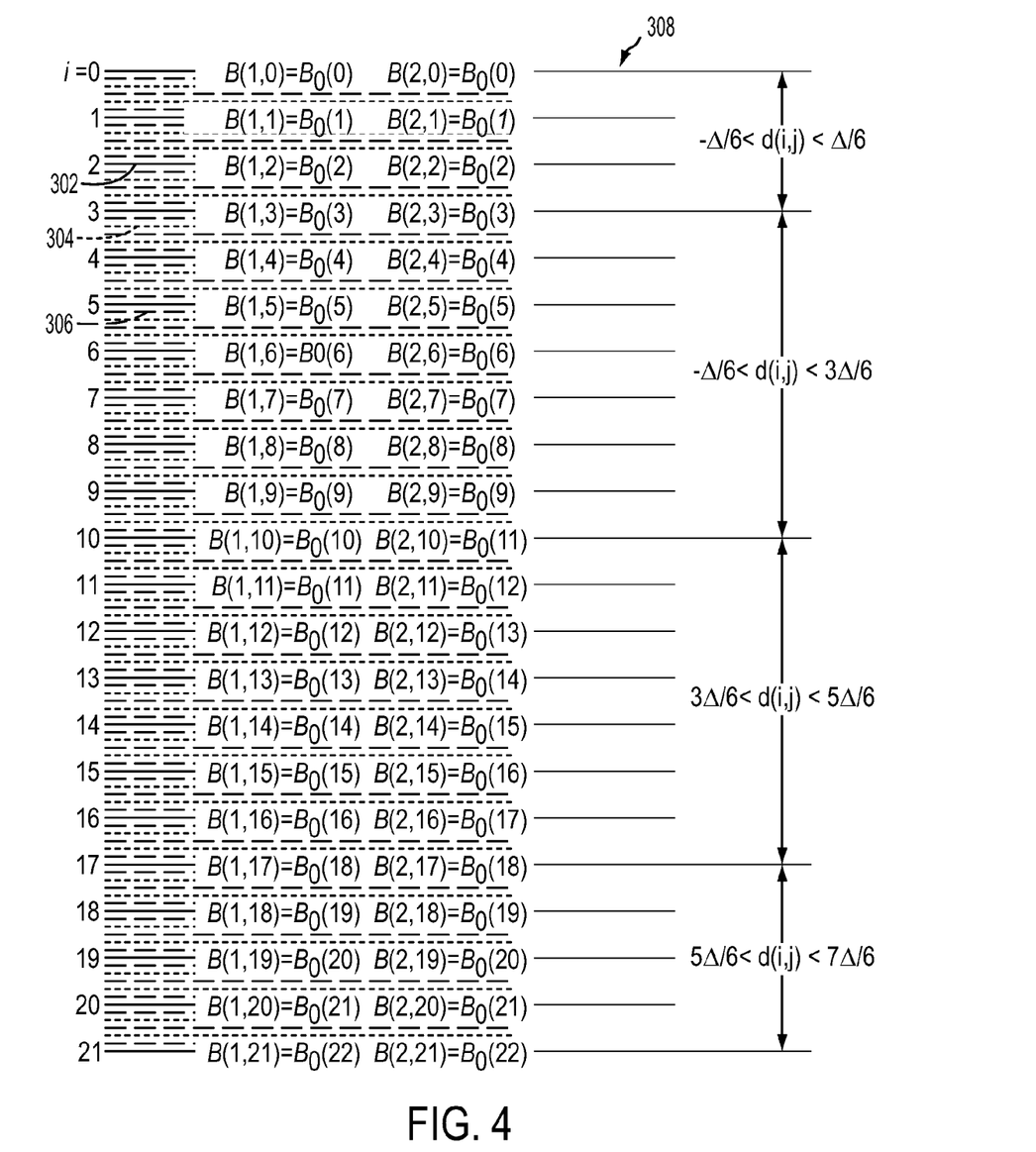
FIG. 4 illustrates the raster resampling presented in Table 1.

FIG. 4 graphically illustrates Table 1, wherein the left side of the figure shows the actual raster positions 302 while the right side of the figure shows the desired raster positions 304. Pseudo rasters 306 that can be achieved by interpolation using ⅓ and ⅔ power writing and threshold displacements 308 that indicate which raster or pseudo raster should be used for a given desired raster are also shown.

With respect to step 104, the extracted raster data is used to drive the raster imager. Depending on the electronic implementation, whole output raster lines may be extracted to completion sequentially. Alternatively, for a 32-beam VCSEL array, 32 adjoining output rasters may be processed concurrently where a small block of one or more pixels are processed for beam 0 followed by a block of pixels of equivalent size for beam 1 and so on until each buffer associated with a beam in the VCSEL array has been loaded with data. Data is processed in similar fashion until the output buffers for all 32 beams are full or until the entire output raster has been processed.

The electronics would start to send image data from the output buffers to the ROS upon receiving a start of scan (SOS) signal from the ROS SOS detector. Data would be continuously written to the output buffers to replace that which has been imaged and is no longer needed.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of achieving process-direction sub-raster magnification correction using non-redundant overwriting, the method comprising:
determining process-direction magnification errors on both sides of a printed sheet and a magnification compensation factor for the printed sheet via a control device in a printing system;
receiving raster data from a digital image path in the printing system;
buffering the raster data in a raster memory buffer in the printing system for overwriting a swath of pixel data;
extracting raster data from the buffer according to a plurality of non-redundant overwriting (NRO) resampling calculations for magnification correction, wherein the NRO resampling calculations comprise:

$$B(1,i,j), n(i) = \text{FLOOR}[¼ + i(1−m)] = \text{CEIL}[i(1−m) − ¾]$$

and $$B(2,i,j), n(i) = \text{FLOOR}[¾ + i(1−m)] = \text{CEIL}[i(1−m) − ¼]$$

where:
i=raster line number,
j=cross-process pixel number,
B(1, i, j)=Output bit written on actual raster number i, pixel j with pass (power) 1,
B(2, i, j)=Output bit written on actual raster number i, pixel j with pass (power) 2,
Δ=Actual raster spacing,
m=Desired magnification change; and
using the extracted raster data to drive a raster imager in the printing system.

2. The method of claim 1, wherein the compensation factor for the printed sheet is determined by at least one of the following methods: offline characterization of paper shrinkage for individual media type or average characterization over a range of media, wherein the offline characterizations are stored and pulled into active use when the appropriate media is being printed; real-time measurement of paper size; and real-time velocity measurement of printer components.

3. The method of claim 1, wherein the magnification errors are uniform in the process direction and the magnification correction is performed at regular intervals.

4. The method of claim 1, wherein the magnification errors are non-uniform in the process direction and a table is used to store displacement errors used in the resampling calculations.

5. The method of claim 1, wherein the process-direction magnification errors are constant in a cross-process direction and the same resampling is applied for a raster line of pixels.

6. The method of claim 1, wherein the process-direction magnification errors are not constant in a cross-process direction and different resampling is along a raster line of pixels.

7. The method of claim 1, wherein the magnification displacement errors are combined with other process direction errors including bow, skew, and photoreceptor speed for use in the resampling calculations.

8. The method of claim 1, wherein the same power is used in overwriting.

9. An apparatus for achieving process-direction sub-raster magnification adjustments using non-redundant overwriting, the apparatus comprising:

an image-forming apparatus that includes a raster imager; and a control device for controlling the image-forming apparatus, wherein the control device is operative to:

determine process-direction magnification errors on both sides of a printed sheet and a magnification compensation factor for the printed sheet;

receive raster data from a digital image path;

buffer the raster data in a raster memory for overwriting a swath of pixel data;

extract raster data from the buffer according to a plurality of non-redundant overwriting (NRO) resampling calculations for magnification correction, wherein the NRO resampling calculations comprise:

$$d(i, j) = d_0(j) + \sum_{k=0}^{i} k(1 - m(i, j))\Delta,$$

$B(1,i,j)=B_0(i+n(i),j)$ for $(-1/4+n(i))\Delta \le d(k) \le (3/4+n(k))\Delta$, $B(2,i,j)=B_0(i+n(i),j)$ for $(-3/4+n(i))\Delta \le d(k) \le (1/4+n(i))\Delta$, where:
i=raster line number,
j=cross-process pixel number,
d(i,j)=distance error,
m(i, j)=magnification in the slow scan direction,
$d_0$(j)=additional offsets,
n(i)=an integer indicating the raster line to draw from, referenced from the current line i,
B(1, i, j)=Output bit written on actual raster number i, pixel j with pass (power) 1,
B(2, i, j)=Output bit written on actual raster number i, pixel j with pass (power) 2,
Δ=Actual raster spacing; and
use the extracted raster data to drive the raster imager.

10. The apparatus of claim 9, wherein the compensation factor for the printed sheet is determined by at least one of the following methods: offline characterization of paper shrinkage for individual media type or average characterization over a range of media, wherein the offline characterizations are stored and pulled into active use when the appropriate media is being printed; real-time measurement of paper size; and real-time velocity measurement of printer components.

11. The apparatus of claim 9, wherein the magnification errors are uniform in the process direction and the magnification correction is performed at regular intervals.

12. The apparatus of claim 9, wherein the magnification errors are non-uniform in the process direction and a table is used to store displacement errors used in the resampling calculations.

13. The apparatus of claim 9, wherein the process-direction magnification errors are constant in a cross-process direction and the same resampling is applied for a raster line of pixels.

14. The apparatus of claim 9, wherein the process-direction magnification errors are not constant in a cross-process direction and different resampling is along a raster line of pixels.

15. The apparatus of claim 9, wherein the magnification displacement errors are combined with other process direction errors including bow, skew, and photoreceptor speed for use in the resampling calculations.

16. The apparatus of claim 9, wherein the same power is used in overwriting.

17. A method of achieving process-direction sub-raster magnification correction using non-redundant overwriting, the method comprising:

determining process-direction magnification errors on both sides of a printed sheet and a magnification compensation factor for the printed sheet via a control device in a printing system;

receiving raster data from a digital image path in the printing system;

buffering the raster data in a raster memory buffer in the printing system for overwriting a swath of pixel data;

extracting raster data from the buffer according to a plurality of non-redundant overwriting (NRO) resampling calculations for magnification correction, wherein the NRO resampling calculations comprise:

$$d(i, j) = d_0(j) + \sum_{k=0}^{i} k(1 - m(i, j))\Delta,$$

$B(1,i,j)=B_0(i+n(i),j)$ for $(-1/6+n(i))\Delta \le d(i) \le (1/6+n(i))\Delta$ $B(1,i,j)=B_0(i+n(i)+1,j)$ for $(1/6+n(i))\Delta \le d(i) \le (3/6+n(i))\Delta$ $B(1,i,j)=B_0(i+n(i),j)$ for $(3/6+n(i))\Delta \le d(i) \le (5/6+n(i))\Delta$ $B(2,i,j)=B_0(i+n(i),j)$ for $(-1/6+n(i))\Delta \le d(i) \le (3/6+n(i))\Delta$ $B(2,i,j)=B_0(i+n(i)+1,j)$ for $(3/6+n(i))\Delta \le d(i) \le (5/6+n(i))\Delta$ where:
i=raster line number,
j=cross-process pixel number,
d(i,j)=distance error,
m(i, j)=magnification in the slow scan direction,
$d_0$(j)=additional offsets,
n(i)=an integer indicating the raster line to draw from, referenced from the current line i,
B(1, i, j)=Output bit written on actual raster number i, pixel j with pass (power) 1,
B(2, i, j)=Output bit written on actual raster number i, pixel j with pass (power) 2,
$B_0$(i, j)=Bit on ideal desired raster i,
Δ=Actual raster spacing; and
using the extracted raster data to drive a raster imager in the printing system.

18. An apparatus for achieving process-direction sub-raster magnification adjustments using non-redundant overwriting, the apparatus comprising:

an image-forming apparatus that includes a raster imager; and a control device for controlling the image-forming apparatus, wherein the control device is operative to:

determine process-direction magnification errors on both sides of a printed sheet and a magnification compensation factor for the printed sheet;

receive raster data from a digital image path;

buffer the raster data in a raster memory for overwriting a swath of pixel data;

extract raster data from the buffer according to a plurality of non-redundant overwriting (NRO) resampling calculations for magnification correction, wherein the NRO resampling calculations comprise:

$$d(i,j) = d_0(j) + \sum_{k=0}^{i} k(1-m(i,j))\Delta,$$

$B(1,i,j)=B_0(i+n(i),j)$ for $d(i)/\Delta-1/6 \le n(i) \le d(i)/\Delta+1/6$ $B(1,i,j)=B_0(i+n(i)+1,j)$ for $d(i)/\Delta-3/6 \le n(i) \le d(i)/\Delta-1/6$ $B(1,i,j)=B_0(i+n(i),j)$ for $d(i)/\Delta-5/6 \le n(i) \le d(i)/\Delta-3/6$ $B(2,i,j)=B_0(i+n(i),j)$ for $d(i)/\Delta-3/6 \le n(i) \le d(i)/\Delta+1/6$ $B(2,i,j)=B_0(i+n(i)+1,j)$ for $d(i)/\Delta-5/6 \le n(i) \le d(i)/\Delta-3/6$ where:
i=raster line number,
j=cross-process pixel number,
n(i)=an integer indicating the raster line to draw from, referenced from the current line i,
d(i,j)=distance error,
m(i, j)=magnification in the slow scan direction,
$d_0(j)$=additional offsets,
B(1, i, j)=Output bit written on actual raster number i, pixel j with pass (power) 1,
B(2, i, j)=Output bit written on actual raster number i, pixel j with pass (power) 2,
Δ=Actual raster spacing; and
use the extracted raster data to drive the raster imager.

\* \* \* \* \*